United States Patent [19]
Tanaka et al.

[11] Patent Number: 5,303,796
[45] Date of Patent: Apr. 19, 1994

[54] TOROIDAL TYPE CONTINUOUSLY VARIABLE TRANSMISSION

[75] Inventors: Hirohisa Tanaka, Tokyo; Takashi Imanishi, Yokohama, both of Japan

[73] Assignee: NSK Ltd., Tokyo, Japan

[21] Appl. No.: 978,723

[22] Filed: Nov. 19, 1992

[30] Foreign Application Priority Data

Dec. 5, 1991 [JP] Japan .................. 3-348458

[51] Int. Cl.⁵ .................. B60K 17/34; B62D 11/10; F16H 15/38
[52] U.S. Cl. .................. 180/233; 180/6.2; 180/248; 180/249; 476/42
[58] Field of Search .................. 476/40, 42; 475/184, 475/192, 197; 180/6.2, 233, 248, 249

[56] References Cited

U.S. PATENT DOCUMENTS

| Re. 26,917 | 6/1970 | Dickenbrock | 476/42 X |
| 2,124,399 | 7/1938 | Hayes | 476/42 |

FOREIGN PATENT DOCUMENTS

| 62-71465 | 5/1987 | Japan . |
| 63-60751 | 4/1988 | Japan . |
| 2-163549 | 6/1990 | Japan . |
| 2248895 | 4/1992 | United Kingdom . |
| WO91/08405 | 6/1991 | World Int. Prop. O. . |

Primary Examiner—Allan D. Herrmann
Attorney, Agent, or Firm—Shapiro and Shapiro

[57] ABSTRACT

In a vehicle having first and second wheels (e.g., front and rear wheels) to be driven with a speed difference, the wheels are driven by a toroidal type continuously variable transmission having a single input shaft and which is effective to accommodate the speed difference between the first and second wheels without a separate differential for such purpose.

5 Claims, 5 Drawing Sheets

TOROIDAL TYPE CONTINUOUSLY VARIABLE TRANSMISSION

BACKGROUND OF THE INVENTION

1. Field of the Invention

The present invention relates to a vehicle drive incorporating a toroidal type continuously variable transmission and more particularly to such a drive for a full-time four wheel drive car in which a drive force is always transmitted to four wheels and for a front-engine front-wheel drive car.

2. Related Background Art

A toroidal type continuously variable transmission as shown in FIGS. 6 and 7 has been studied for use as an automobile transmission. As disclosed in Japanese Laid-Open Utility Model application Ser. No. 62-71465, in the toroidal type continuously variable transmission, an input disk 2 is supported coaxially to an input shaft 1 and an output disk 4 is fixed to an end of an output shaft 3. Trunnions 5 which are swung around respective pivot axes transverse to the input shaft 1 and the output shaft 3 are mounted on a support bracket arranged on an inner surface of a casing or in the casing in which the toroidal type continuously variable transmission is housed. Power rollers 7 are rotatably supported around displaceable shafts 6 arranged at the centers of the trunnions 5. The power rollers 7 are held between the input disk 2 and the output disk 4.

Arcuate input and output concave surfaces 2a and 4a are formed on the opposing surfaces at axial ends of the input disk 2 and the output disk 4. Peripheral surfaces 7a of the spherical convex power rollers 7 abut against the input concave surface 2a and the output concave surface 4a.

A loading cam type pressure device 8 is provided between the input shaft 1 and the input disk 2 to resiliently urge the input disk 2 to the output disk 4. The pressure device 8 comprises a cam plate 9 which rotates with the input shaft 1 and a plurality of (for example four) rollers 11 held by a holder 10. A cam surface 12 which comprises a circumferential uneven surface is formed on one surface (right surface in FIGS. 6 and 7) of the cam plate 9, and a similar cam surface 13 is formed on an outer surface (left surface in FIGS. 6 and 7) of the input disk 2. The rollers 11 are rotatable around an axis which is radial to the center of the input shaft 1.

When the cam plate 9 is rotated as the input shaft 1 is rotated, the rollers 11 are urged to the outer cam surface 13 of the input disk 2 by the cam surface 12. As a result, the input disk 2 is urged to the power rollers 7 and the input disk 2 is rotated by the engagement of the pair of cam surfaces 12 and 13 and the rollers 11. The rotation of the input disk 2 is transmitted to the output disk 4 through the power rollers 7 so that the output shaft 3 fixed to the output disk 4 is rotated.

When rotating speeds of the input shaft 1 and the output shaft 3 are to be changed, for example, when the deceleration is to be made between the input shaft 1 and the output shaft 3, the trunnions 5 are swung around the pivot shaft to the position shown in FIG. 6 to incline the displaceable shafts 6 so that the peripheral surfaces 7a of the power rollers 7 abut against a center portion of the input concave surface 2a and an outer portion of the output concave surface 4a, respectively. When the acceleration is to be made, the trunnions 5 are swung to the position shown in FIG. 7 to incline the displaceable shafts 6 so that the peripheral surfaces 7a of the power rollers 7 abut against the outer portion of the input concave surface 2a and the center portion of the output concave surface 4a. When the angles of inclination of the displaceable shafts 6 are selected to an intermediate state between those of FIGS. 6 and 7, an intermediate speed change ratio of the input shaft 1 and the output shaft 3 is attained.

Japanese Laid-Open Utility Model application Ser. No. 63-60751 and Japanese Laid-Open Patent application Ser. No. 2-163549 disclose the (tandem) arrangement of a pair of toroidal type continuously variable transmission as shown in FIGS. 6 and 7 in parallel relative to the direction of transmission of the power.

FIG. 8 shows a structure disclosed in the Japanese Laid-Open Utility Model application Ser. No. 63-60751. A rotating force applied to an input shaft 1 is transmitted to two output disks 4 from two input disks 2 supported around the input shaft 1 through power rollers 7. The output disks 4 are rotatably supported around the input shaft 1.

The rotating forces of the two output disks 4 are transmitted to a disk-like cam plate 14 through rollers 11. The rotating force transmitted to the cam plate 14 is transmitted to an output shaft 3 through gears 15 meshed with teeth formed on an outer periphery of the cam plate 14, transmission shafts 16 having ends thereof fixed to the gears 15, gears 17 fixed to the other ends of the transmission shafts 16 and a gear 18 meshed with the gears 17.

As shown in the simplified diagram of FIG. 9, in the toroidal type continuously variable transmission constructed as described above, the rotating force of the input shaft 1 which is driven by the engine 20 is transmitted to the two parallel toroidal type variable transmissions 21 and the outputs of the two toroidal type variable transmissions 21 are taken out by the output shaft 3.

Where such toroidal type continuously variable transmission is used as a transmission for a four-wheel drive apparatus, the driving force once concentrated to the single output shaft 3 is to be redistributed to the two front and rear drive shafts. The repetition of the concentration and the distribution of the rotating drive force causes complexity in construction and increases the power loss due to friction.

To avoid the above problem, it has been proposed, as shown in FIG. 9B, to separately take out the outputs of the two toroidal transmissions 21 by two output shafts 3a and 3b and drive the front wheels by the output shaft 3a and the rear wheels by the other output shaft 3b.

However, if the two toroidal type continuously variable transmissions as shown in FIGS. 6 and 7 are arranged in parallel, a number of bearings to rotatably support the elements are required and the construction becomes complex and the power loss increases.

SUMMARY OF THE INVENTION

It is an object of the present invention to provide an improved drive system for four-wheel drive and front-wheel drive vehicles.

A more specific object of the invention is to provide an improved drive arrangement in a vehicle having first and second wheels to be driven with a speed difference. In accordance with the improved arrangement of the invention, the first and second wheels are driven by a toroidal type continuously variable transmission having a single input shaft and which is effective to eliminate the need for a separate differential to absorb the speed difference between the first and second wheels. The transmission may include, more particularly, an input shaft, a pair of input disks non-rotatably mounted to the input shaft and each having an arcuately concave engagement surface at an axial end thereof, a pair of output disks each corresponding to a respective one of the input disks and having an arcuately concave engagement surface facing that of the corresponding input disk, a first plurality of power rollers having respective convex peripheries engaging the engagement surfaces of one of the input disks and the corresponding output disk, and a second plurality of power rollers having respective convex peripheries engaging the engagement surfaces of the other input disk and the other output disk, with each power roller being rotatably mounted to a displaceable shaft supported by a corresponding trunnion which is pivotable on a pivot axis transverse to the axis of the input shaft. The transmission further includes output means for independently taking out rotating motions of the pair of output disks for transmission to the first and second wheels, respectively, the speed difference between the first and second wheels thus being accommodated by the transmission itself.

In the present invention, an operation to change a speed change ratio between the input shaft and the output means is same as that of the prior art toroidal type continuously variable transmission described above.

In the present invention, since the rotating motion transmitted from the pair of input disks to the pair of output disks are independently taken out, the angle of inclination of one displaceable shaft may be different from the angle of inclination of the other displaceable shaft if, for example, the front wheels are driven by the rotating motion taken out of one output disk and the rear wheels are driven by the rotating motion taken out of the other output disk. Thus, the four-wheel driven car can be driven while a difference between the rotating speeds of the front wheels and the rear wheels when a course of the car is to be changed is absorbed.

Since only one input shaft is used, the number of bearings required to rotatably support the elements is smaller than that required when two toroidal type continuously variable transmissions are arranged in parallel and the power loss is lower.

DETAILED DESCRIPTION OF THE PREFERRED EMBODIMENTS

Figure 1:
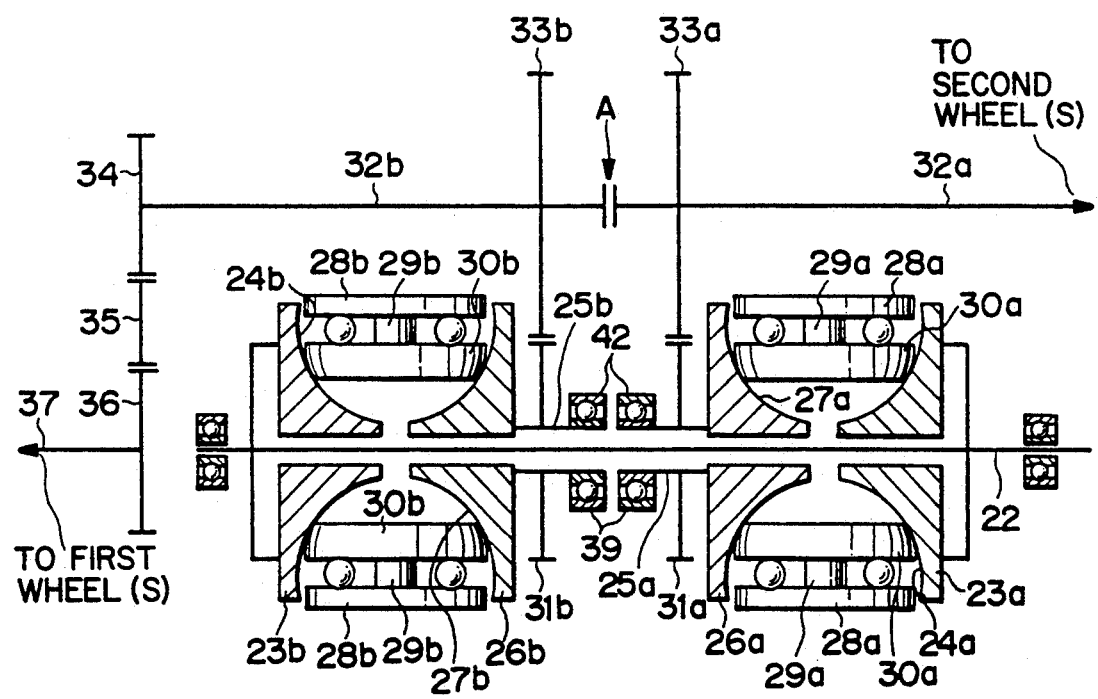
FIG. 1 shows a schematic sectional view of a first embodiment of the present invention.
Figure 2:
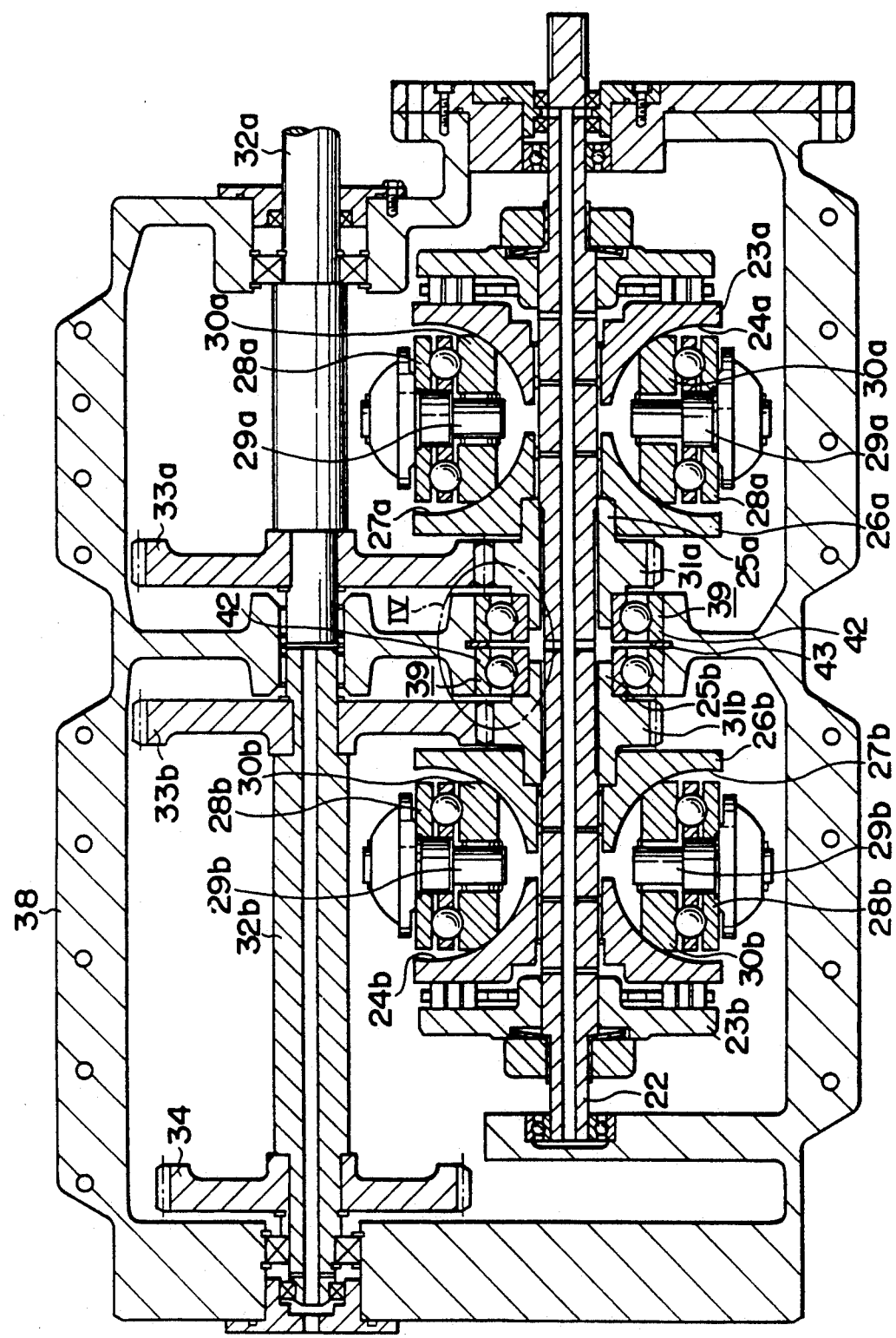
FIG. 2 shows a sectional view of a specific structure.
Figure 3:
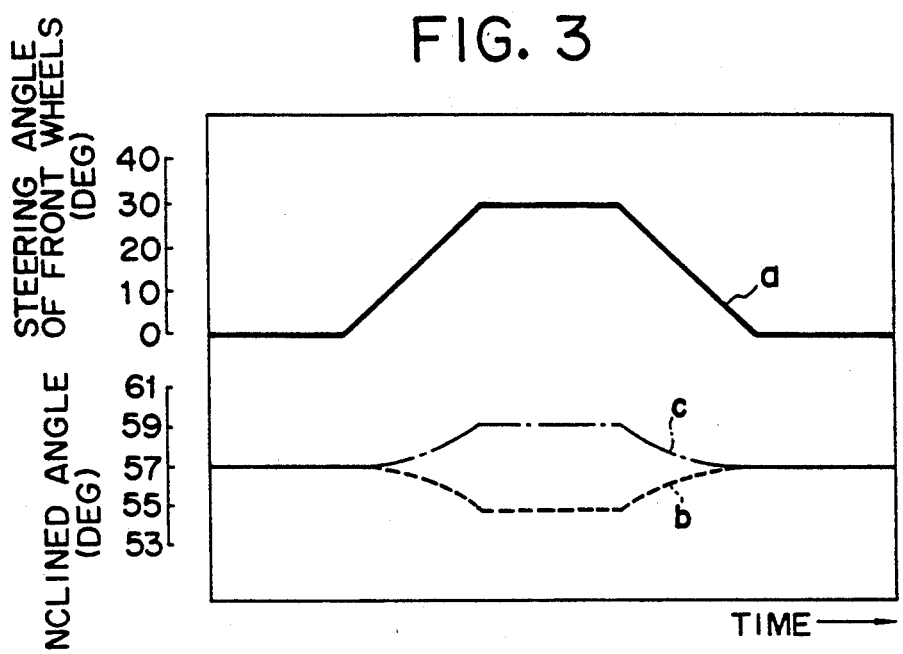
FIG. 3 shows a diagram illustrating a relation between a front wheel steering angle and a displacement shaft.

FIGS. 1 to 3 show a first embodiment of the present invention. FIG. 1 is a schematic sectional view and FIG. 2 is a sectional view showing a specific structure, and the like elements are designated by the like numerals.

A pair of input disks 23a and 23b are non rotatably mounted to peripheral opposite ends of an input shaft 22. Surfaces of the input disks 23a and 23b which axially face each other form input concave surfaces 24a and 24b having an arcuate cross-section.

A pair of tubular output shafts 25a and 25b are rotatably supported to the input shaft 22 at an intermediate portion of the input shaft 22. Output disks 26a and 26b are fixed to outer ends of the output shafts 25a and 25b. Surfaces of the output disks 26a and 26b which axially face the input concave surfaces 24a and 24b form output concave surfaces 27a and 27b having an arcuate cross-section as the input concave planes 24a and 24b do.

A plurality of trunnions 28a which swing around respective pivot axes transverse to the input shaft 22 is provided between the one input disk 23a and the output disk 26a. Another plurality of trunnions 28b which also swing around respective pivot axes transverse to the input shaft 22 is provided between the other input disk 23b and the output disk 26b.

Power rollers 30a and 30b are rotatably supported by displaceable shafts 29a and 29b fixed to surfaces of trunnions 28a and 28b facing the input shaft 22. The peripheral surfaces of the power rollers 30a and 30b form spherical convex surfaces having substantially equal radii of curvature as those of the input concave surfaces 24a and 24b and the output concave surfaces 27a and 27b, respectively. The power rollers 30a and 30b are held between the input disks 23a and 23b and the output disks 26a and 26b so that the output disks 26a and 26b are rotated as the input disks 23a and 23b rotate, respectively.

Gears 31a and 31b fixed to an outer periphery of the intermediate portions of the output shafts 25a and 25b and gears 33a and 33b fixed to a pair of transmission shafts 32a and 32b are engaged to form output means for independently taking out the rotating motions of the pair of output disks 26a and 26b.

The rotating motion of the one transmission shaft 32a of the pair of transmission shafts 32a and 32b is taken out of a transmission case 38 as it is and used to drive front wheels (or rear wheels) through differential gears. The rotating motion of the other transmission shaft 32b is transmitted to a take-out shaft 37 through gears 34, 35 and 36 and taken out of the transmission case 38 by the take-out shaft 37 to drive rear wheels (or front wheels) through other differential gears.

An operation in changing the speed change ratio between the single input shaft 22 and the two transmission shafts 32a and 32b is same as that of the prior art toroidal type continuously transmission described above.

Namely, the speed change ratio between the input shaft 22 and the one transmission shaft 32a can be changed by displacing the power rollers 30a supported by the trunnions 28a, and the speed change ratio between the input shaft 22 and the other transmission shaft 32b can be changed by displacing the power rollers 30b supported by the other trunnions 28b.

In the toroidal type continuously variable transmission of the present invention, the rotating motions transmitted to the pair of output disks 26a and 26b from the pair of input disks 23a and 23b fixed to the single input shaft 22 are independently taken out, and the front wheels are driven by the rotating motion taken out of the one output disk 26a to the transmission shaft 32a while the rear wheels are driven by the rotating motion taken out of the other output disk 26b to the transmission shaft 32b. In this manner, the four-wheel driven car can be driven.

In such drive of the four-wheel driven car, the angle of inclination of the displaceable shafts 29a mounted on the trunnions 28a and the angle of inclination of the displaceable shafts 29b mounted on the other trunnions may be different from each other so that the four-wheel driven car can be driven while the difference between the rotating speeds of the front wheels and the rear wheels when the course of the car is changed is absorbed.

More particularly, when the course of the car is to be changed, the rotating speed of the inner wheel relative to the direction of turn is smaller than that of the outer wheel, and the rotating speed of the rear wheels is smaller than that of the front wheels. The difference between the rotating speeds of the outer wheels and the inner wheels may be absorbed by the differential gears, but in order to absorb the difference between the rotating speeds of the front wheels and the rear wheels, the prior art four-wheel driven car used a differential device called a center differential or a viscosity fluidic joint in addition to a transmission. In contrast, when the toroidal type continuously variable transmission of the present invention is used, the difference between the rotating speeds can be absorbed by the transmission alone.

As shown in FIG. 3, when a steering angle imparted to the front wheels changes as shown by a solid line a, the angle of inclination of the one set of power rollers 30a for transmitting the rotating force from the engine to the front wheels is slightly reduced compared to that in the straightforward drive, as shown by a broken line b. This sets the rotating speed of the front wheels slightly higher than that in the straightforward drive. Also, the angle of inclination of the other set of power rollers 30b for transmitting the rotating force of the engine to the rear wheels is increased slightly compared to that in the straightforward drive, as shown by a dotted line c. This sets the rotating speed of the rear wheels slightly lower than that in the straightforward drive.

Figure 6:
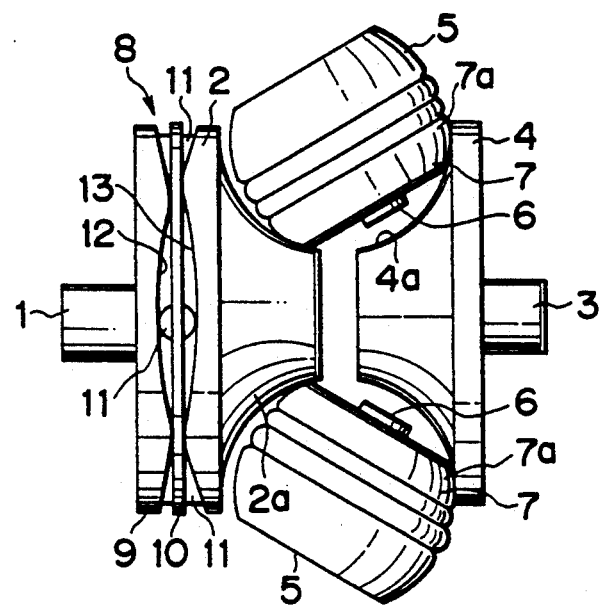
FIG. 6 shows a side view of a basic structure of a toroidal type continuously variable transmission in a maximum deceleration state.
Figure 7:
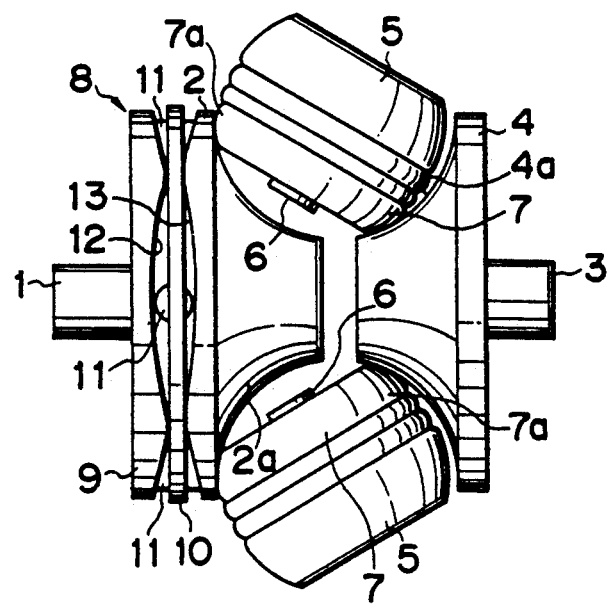
FIG. 7 shows a similar side view in a maximum acceleration state.
Figure 8:
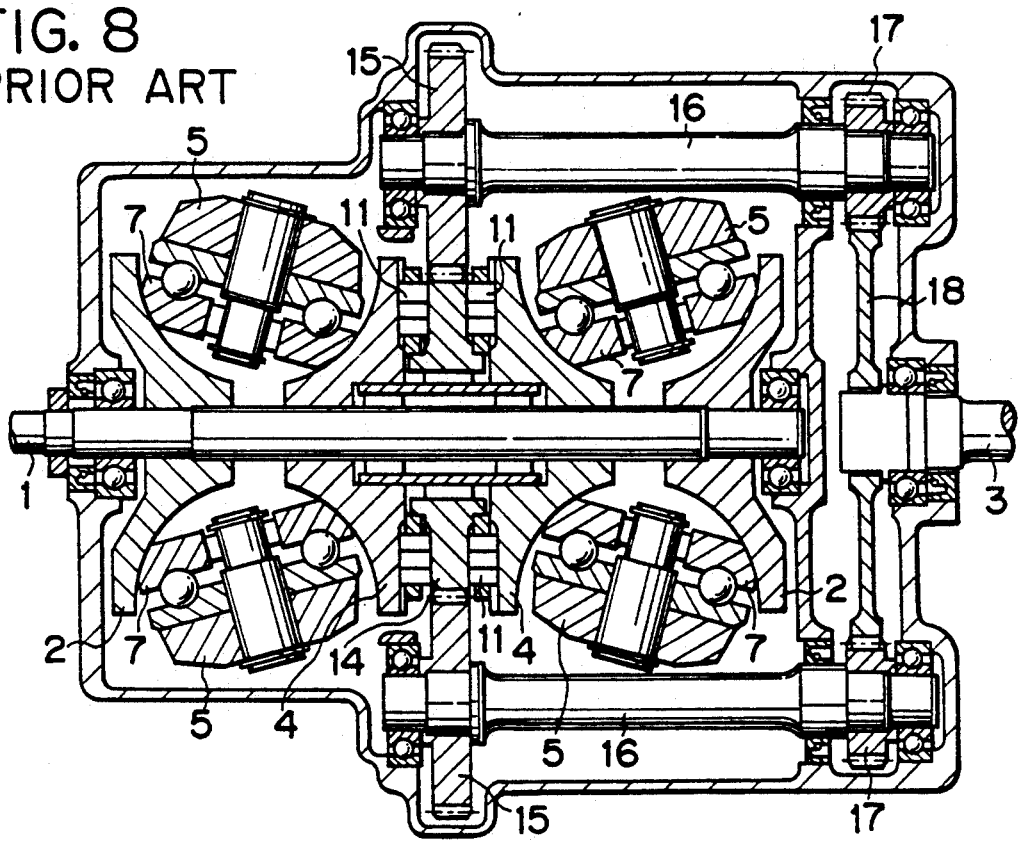
FIG. 8 shows a sectional view of a prior art structure.
Figure 9A:
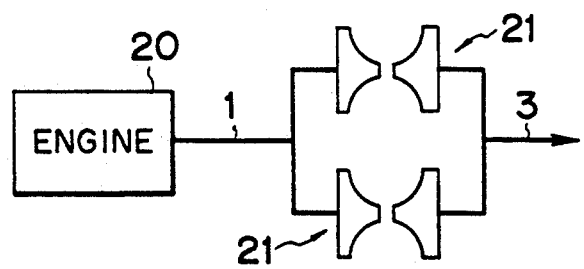
FIGS. 9A and 9B show two examples of providing a toroidal type continuously variable transmission in a four-wheel driven car.
Figure 9B:
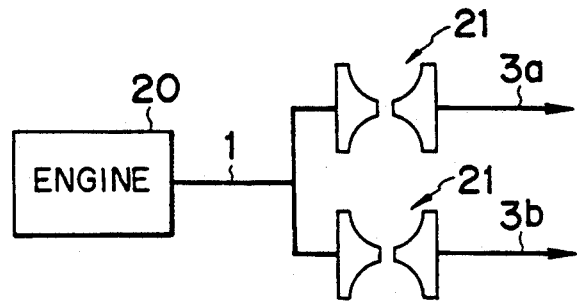

The above operation may be attained by parallelly providing two toroidal type continuously variable transmissions as shown in FIGS. 6 and 7, but in this case two input shafts 1 are required. Thus, the number of bearings increases, the construction is complex and the power loss increases. In the toroidal type continuously variable transmission of the present invention, since there is only a single input shaft 22, the number of bearings for rotatably supporting the elements including the input shaft 22 is smaller and the power loss is suppressed.

Figure 4:
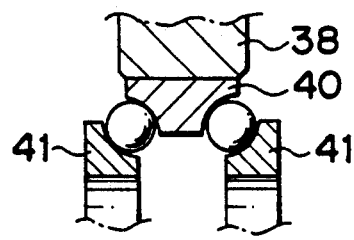
FIG. 4 shows a sectional view of a portion IV of FIG. 2 to illustrate a modification of an output shaft support unit.

FIG. 4 shows a modification of the bearing for rotatably supporting the pair of output shafts 25a and 25b. In the structure shown in FIGS. 1 and 2, independent angular ball bearings 39 are combined back-to-back to hold a washer 43 (see FIG. 2, omitted in FIG. 1) between ends of outer rings 42 in order to support both axial and thrust loads applied to the output shafts 25a and 25b. In the structure shown in FIG. 4, a set of angular ball bearings are formed by one outer ring 40 and two inner rings 41. The outer ring 40 is internally fitted into the transmission case 38 (FIG. 2) and the inner rings 41 are externally fitted to the ends of the output shafts 25a and 25b.

Whichever arrangement the pair of output shafts 25a and 25b are supported by, the axial loads applied from the power rollers 30a and 30b to the output disks 26a and 26b when the transmission is operated are cancelled out by the angular ball bearings and not transmitted to other areas. Accordingly, it is not necessary that the rigidity of the portions which support the axial loads applied to the output disks 26a and 26b be very high, and the weight of the overall device can be reduced.

Figure 5:
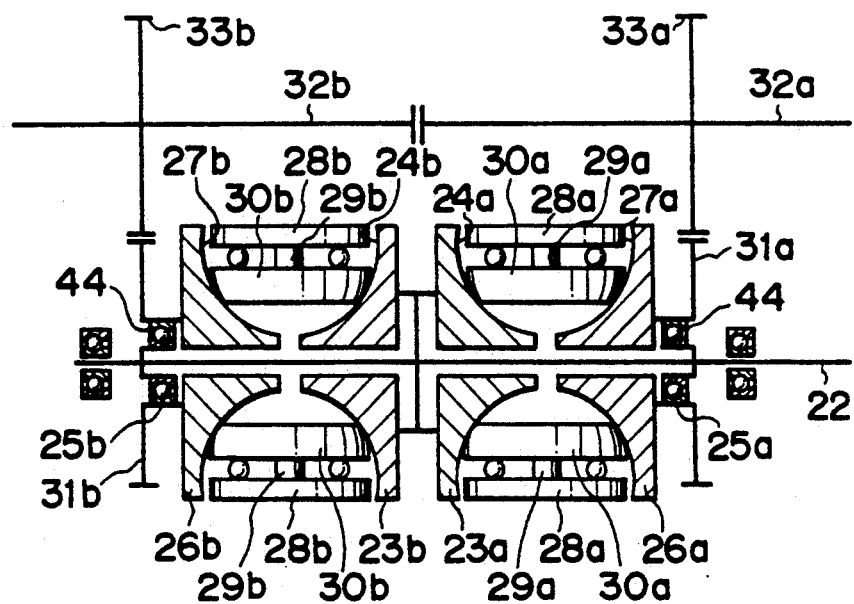
FIG. 5 shows a schematic sectional view of a second embodiment of the present invention.

FIG. 5 shows a second embodiment of the present invention. In the first embodiment, the pair of input disks 23a and 23b are fixed to the opposite ends of the input shaft 22, and the pair of output shafts 25a and 25b and the output disks 26a and 26b are rotatably supported by the intermediate area of the input shaft 22. In the present embodiment, the pair of input disks 23a and 23b are fixed to the intermediate area of the input shaft 22, and the pair of output shafts 25a and 25b and the output disks 26a and 26b are rotatably supported by the opposite ends of the input shaft 22.

In the present embodiment, the axial loads applied from the output disks 26a and 26b to the pair of output shafts 25a and 25b are applied to the single input shaft 22 through a pair of bearings 44 provided between the output shafts 25a and 25b and the input shaft 22 and cancelled out. Other aspect of construction and operation are similar to those of the first embodiment, wherefore like elements are designated by the like numerals, and duplicate explanation is omitted.

In a full time four-wheel driven car, a so-called differential lock mechanism for linking the front wheels and the rear wheels for getting out of mud or driving on snow may be provided. In the toroidal type continuously variable transmission of the present invention, the differential lock function may be attained by providing a clutch, which is actuated and deactuated by an external command, between the ends of the pair of transmission shafts 32a and 32b (at A in FIG. 1).

The output means for independently taking out the rotating forces of the output shafts 25a and 25b may be the gear transmission mechanism as shown or another transmission mechanism such as a belt transmission mechanism or a chain transmission mechanism. When the toroidal type continuously variable transmission of the present invention is used as a speed changer of a front engine, front drive car, the differential gear may be omitted.

In accordance with the toroidal type continuously variable transmission of the present invention, the full time four-wheel driven car and the front engine, front drive car can be smoothly driven without providing mechanisms such as a center differential or differential gears, and the power loss is reduced. Accordingly, a high performance full time four-wheel driven car or front engine, front drive car can be provided at a low cost.

What is claimed is:

1. In a vehicle having first and second wheels to be driven with a speed difference therebetween, the improvement wherein said wheels are driven by a transmission which is effective to accommodate the speed difference without a separate differential for such purpose, said transmission being a toroidal type continuously variable transmission including an input shaft, a pair of input disks non-rotatably mounted to said input shaft and each having an arcuately concave engagement surface at an axial end thereof, a pair of output disks each corresponding to a respective one of said input disks and having an arcuately concave engagement surface facing that of the corresponding input disk, a first plurality of power rollers having respective convex peripheries engaging the engagement surfaces of one of said input disks and the corresponding output disk, a second plurality of power rollers having respective convex peripheries engaging the engagement surfaces of the other input disk and the other output disk, each power roller being rotatably mounted to a displaceable shaft by a corresponding trunnion which is pivotable on a pivot axis transverse to the axis of said input shaft, and output means for independently taking out rotating motions of said pair of output disks for transmission to said first and second wheels, respectively.

2. The improvement of claim 1, wherein said first and second wheels are the front and rear wheels, respectively, of a four-wheel drive vehicle.

3. The improvement of claim 2, further including means for effecting a differential lock between the front wheels and the rear wheels.

4. The improvement of claim 3, wherein said output means includes a first output shaft coupled to one of said output disks and a second output shaft coupled to the other of said output disks, and said differential lock means includes a clutch for interlocking said first and second output shafts.

5. The improvement of claim 1, wherein said first and second wheels are the left and right front wheels, respectively, of a front-wheel drive vehicle.

* * * * *